(12) United States Patent
Naito et al.

(10) Patent No.: US 7,250,212 B2
(45) Date of Patent: Jul. 31, 2007

(54) POROUS BODY-COATED FIBER, POROUS BODY-COATED PARTICLE, AND FORMED ARTICLE USING THE SAME

(75) Inventors: Makio Naito, 3-707, Hozumidai, Ibaraki-shi, Osaka (JP) 567-0044; Hiroya Abe, Osaka (JP); Yasuo Ito, Shizuoka (JP); Takahiro Ohmura, Shizuoka (JP); Takehisa Fukui, Osaka (JP); Masahiro Yoshikawa, Osaka (JP)

(73) Assignees: Nichias Corporation, Tokyo (JP); Hosokawa Powder Technology Research Institute, Osaka (JP); Makio Naito, Osaka (JP)

( * ) Notice: Subject to any disclaimer, the term of this patent is extended or adjusted under 35 U.S.C. 154(b) by 115 days.

(21) Appl. No.: 10/855,895

(22) Filed: May 28, 2004

(65) Prior Publication Data

US 2005/0011343 A1     Jan. 20, 2005

(30) Foreign Application Priority Data

May 29, 2003   (JP)   ............................ P.2003-152877
Sep. 9, 2003   (JP)   ............................ P.2003-316772

(51) Int. Cl.
*D02G 3/00*   (2006.01)
*B32B 9/00*   (2006.01)

(52) U.S. Cl. ...................... 428/372; 428/367; 428/368; 428/378; 428/389

(58) Field of Classification Search ................ 428/367, 428/368, 372, 379, 386, 387, 388, 389; 501/95.1; 502/527.14, 527.15, 527.16
See application file for complete search history.

(56) References Cited

U.S. PATENT DOCUMENTS

| | | | | |
|---|---|---|---|---|
| 3,022,366 | A | * | 2/1962 | Kilroy ........................ 429/144 |
| 3,936,383 | A | * | 2/1976 | Daimon et al. ............. 428/421 |
| 5,834,114 | A | * | 11/1998 | Economy et al. ............ 428/368 |
| 6,121,191 | A | * | 9/2000 | Komatsu et al. ............ 502/330 |
| 6,265,341 | B1 | * | 7/2001 | Komatsu et al. ............ 502/326 |
| 6,365,545 | B1 | * | 4/2002 | Komatsu et al. ............ 502/326 |
| 6,936,306 | B1 | * | 8/2005 | Barron et al. ............... 427/226 |
| 2004/0226813 | A1 | * | 11/2004 | Wang ...................... 204/157.3 |
| 2004/0231307 | A1 | * | 11/2004 | Wood et al. .................. 55/523 |

* cited by examiner

*Primary Examiner*—Jill Gray
(74) *Attorney, Agent, or Firm*—Nixon & Vanderhye P.C.

(57) ABSTRACT

A formed article obtained by pressure forming a porous body-coated fiber includes an inorganic fiber and a porous body made of fine inorganic particles associated with one another in a ring-shaped or helical manner to form secondary particles. The inorganic fiber is coated with the porous body. Also provided is a formed article made from porous body-coated fiber on a porous body-coated particle. The porous body-coated particle includes a core particle and a porous body made of fine particles of a first inorganic compound associated with one another in ring-shaped or helical manner to form secondary particles. The core particle is coated with the porous body.

17 Claims, 7 Drawing Sheets

POROUS BODY-COATED FIBER, POROUS BODY-COATED PARTICLE, AND FORMED ARTICLE USING THE SAME

This application claims priority to JP Application No. 2003-152877, filed 29 May 2003 and JP Application No. 2003-316772, filed 09 Sep. 2003. The entire contents of these applications are incorporated herein by reference.

FIELD OF THE INVENTION

The present invention relates to a porous body-coated fiber and a porous body-coated particle. The invention also relates to formed articles using the porous body-coated fiber or the porous body-coated particle.

BACKGROUND OF THE INVENTION

As heat insulating materials having lower thermal conductivity and excellent heat insulating performance, there have been known low-thermal-conductive heat-insulating materials obtained by mixing ultrafine granular anhydrous silica which is a low thermal conductive material (for example, Aerosil (trade name) manufactured by Nippon Aerosil Co., Ltd), a ceramic fiber and further a radiation absorption scattering material comprising particles of silicon nitride, titanium oxide, zirconium oxide or the like, and press molding the resulting mixture, followed by machining (see the following patent documents 1 to 6).

Patent Document 1: JP 07-267756 A
Patent Document 2: JP 10-509940 A
Patent Document 3: JP 10-509941 A
Patent Document 4: JP 11-513349 A
Patent Document 5: JP 11-514959 A.
Patent Document 6: JP 2000-506570 A The above-mentioned ultrafine granular anhydrous silica or supercritical dry silica is fine particles having a diameter of several nanometers to tens of nanometers, and a low thermal conductive material having a thermal conductivity at ordinary temperature (25° C.) of about 0.01 W/(m·k). However, the ultrafine granular anhydrous silica or supercritical dry silica associates by cohesive forces to form secondary particles, because they are fine particles having a diameter of several nanometers to several tens of nanometers. As schematically shown in FIGS. 8(A) and 8(B), the secondary particles 10 are dispersed among inorganic fibers 1F such as ceramic fibers or glass fibers. Accordingly, interfiber thermal conduction occurs at portions where the inorganic fibers 1F are entangled, which causes the low thermal conductivity of the ultrafine granular anhydrous silica or supercritical dry silica to be largely impaired. For example, glass fiber has a thermal conductivity of about 0.1 W/(m·k), and the heat insulating performance of the whole heat insulating material greatly depends on the thermal conductivity of the glass fiber.

Further, a radiation absorption scattering material $1a$ is effective for reducing thermal conduction in a high-temperature region exceeding 200° C. However, solid conduction occurs between the adjacent radiation absorption scattering materials, and particularly, thermal conduction in a low-temperature region of 200° C. or lower increases. Still further, solid conduction also occurs between the radiation absorption scattering material $1a$ and the inorganic fiber 1F.

Furthermore, a kneaded product of the inorganic fiber 1F, the ultrafine granular anhydrous silica or supercritical dry silica and further the radiation absorption scattering material $1a$ is press molded using no binder, attaching importance to the heat insulating performance. This causes insufficient mechanical strength, so that the heat insulating material is cracked or chipping of cut edges is liable to occur. It has therefore the disadvantage of being poor in handling ability or processability. Further, the secondary particles 10 of the ultrafine granular anhydrous silica or supercritical dry silica merely get into among the fibers, so that adhesion force between the secondary particles 10 and the inorganic fiber 1F is low. Accordingly, the secondary particles 10 are eliminated (powder omission) to contaminate the outside. There is therefore also the problem that it is difficult to use for applications requiring cleanness, such as a semiconductor manufacturing apparatus.

SUMMARY OF THE INVENTION

It is therefore an object of the invention to provide a formed article excellent in heat insulating performance and also excellent in mechanical strength, handling ability and processability.

Another object of the invention is to provide a porous body-coated fiber and a porous body-coated particle suitable for obtaining the above-mentioned formed article, and a precursor for the heat insulating material containing the above-mentioned porous body-coated particle.

Other objects and effects of the invention will become apparent from the following description.

In a first aspect, the present invention relates to a porous body-coated fiber and a formed article obtained by pressure-forming the porous body-coated fiber (This aspect of the present invention is hereinafter referred to as "first invention").

The first invention provides the following porous body-coated fibers and formed articles.

(1A) A porous body-coated fiber comprising:
an inorganic fiber; and
a porous body comprising fine inorganic particles associated with one another in ring-shaped or helical manner to form secondary particles,
wherein said inorganic fiber is coated with said porous body.

(2A) The porous body-coated fiber according to item (1A) above, wherein said inorganic fiber has an average fiber diameter of 15 µm or less, and an average fiber length of 50 µm or more.

(3A) The porous body-coated fiber according to item (1A) or (2A) above, wherein said fine inorganic particles have an average primary particle size of 5 to 50 nm.

(4A) The porous body-coated fiber according to any one of items (1A) to (3A) above, wherein said secondary particles have an inside diameter of the ring of 0.1 µm or less.

(5A) The porous body-coated fiber according to any one of items (1A) to (4A) above, comprising 5 to 50% by weight of said inorganic fiber and 50 to 95% by weight of said fine inorganic particles.

(6A) A formed article obtained by pressure-forming the porous body-coated fiber according to any one of items (1A) to (5A) above.

(7A) The heat insulating material according to item (6A) above, having a bulk density of 200 to 600 kg/m$^3$ and a bending strength of 0.5 MPa or more.

(8A) The heat insulating material according to item (6A) or (7A) above, having a thermal conductivity at ordinary temperature of 0.04 W/(m·k) or less.

In a second aspect, the present invention relates to a porous body-coated particle, a formed article precursor containing the porous body-coated particle, and a formed article obtained by pressure-forming the precursor (This aspect of the present invention is hereinafter referred to as "second invention").

The second invention provides the following porous body-coated particles, precursors, and formed articles.

(1B) A porous body-coated particle comprising:
a core particle comprising a second inorganic compound; and
a porous body comprising fine particles of a first inorganic compound associated with one another in ring-shaped or helical manner to form secondary particles,
wherein said core particle is coated with said porous body.

(2B) The porous body-coated particle according to item (1B) above, wherein said core particle has an average particle size of 30 µm or less.

(3B) The porous body-coated particle according to item (1B) or (2B) above, wherein said fine particles have an average primary particle size of 5 to 50 nm.

(4B) The porous body-coated particle according to any one of items (1B) to (3B) above, wherein said secondary particles have an inside diameter of the ring of 0.1 µm or less.

(5B) The porous body-coated particle according to any one of items (1B) to (4B) above, comprising 5 to 50% by weight of said core particle and 50 to 95% by weight of said fine particles.

(6B) A formed article precursor comprising:
at least one fiber material selected from the group consisting of:
an inorganic fiber; and
a porous body-coated fiber comprising an inorganic fiber and a porous body which comprises fine inorganic particles associated with one another in ring-shaped or helical manner to form secondary particles, said inorganic fiber being coated with said porous body; and
the porous body-coated particle according to any one of items (1B) to (5B) above.

(7B) The precursor according to item (6B) above, which comprises 55 to 95% by weight of said porous body-coated particle and 5 to 45% by weight of said fiber material.

(8B) A formed article obtained by pressure-forming the precursor according to item (6B) or (7B) above.

(9B) The formed article according to item (8B) above, having a bulk density of 200 to 600 kg/M$^3$ and a bending strength of 0.3 MPa or more.

(10B) The formed article according to item (9B) above, having a thermal conductivity at 1,000° C. of 0.04 W/(m·k) or less.

According to the present invention, a formed article excellent in heat insulating performance and also excellent in mechanical strength, handling ability and processability can be provided. Furthermore, according to the present invention, a porous body-coated fiber, a porous body-coated particle, and a formed body precursor containing the porous body-coated particle, each suitable for obtaining the above-mentioned formed article can be provided.

DETAILED DESCRIPTION OF THE INVENTION

Firstly, the first invention will be described in detail below, with reference to the accompanying drawings.

Figure 1:
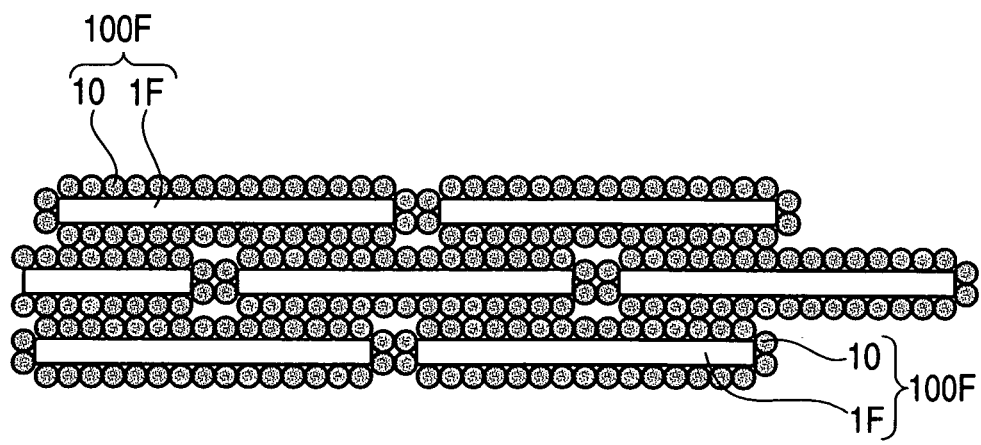
FIG. 1 is a schematic view showing one example of the formed article comprising the porous body-coated fiber according to the first invention.
Figure 3:
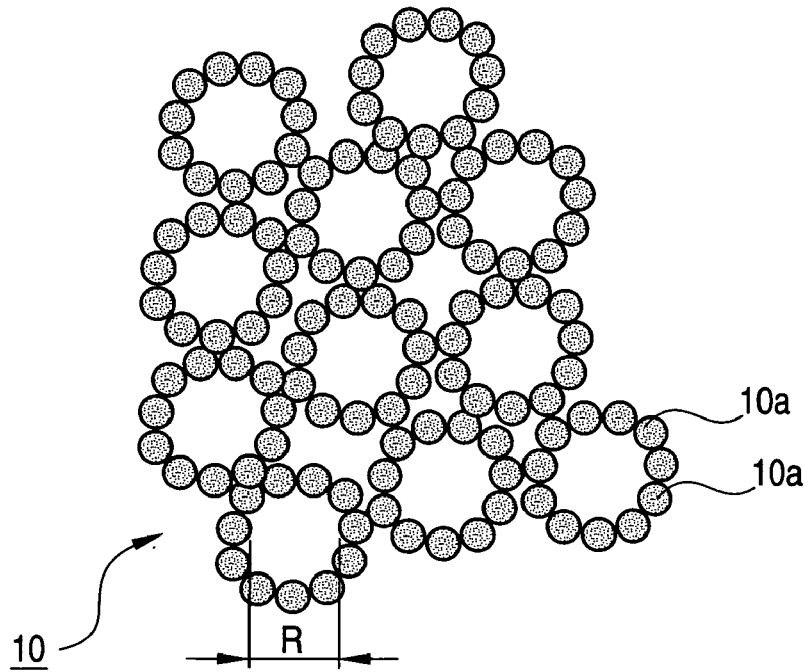
FIG. 3 is a schematic view showing one example of the secondary particles comprising the fine inorganic particles.

FIG. 1 is a schematic view showing the porous body-coated fiber of the first invention, and FIG. 3 is an enlarged schematic view showing the secondary particles comprising the fine inorganic particles. As shown in the drawings, secondary particles 10 formed by a plurality of fine inorganic particles 10a associated with one another in ring-shaped or helical manner are fixed onto an inorganic fiber 1F and further accumulate thereon to form a porous body covering the inorganic fiber 1F, thus forming the porous body-coated fiber 100F of the first invention.

The fine inorganic particles 10a are fine particles comprising a low thermal conductive inorganic material, and, for example, they may be ultrafine granular anhydrous silica or supercritical dry silica. As described above, these materials have a thermal conductivity at ordinary temperature (25° C) of about 0.01 W/(m·k), and they are also preferred in the first invention. In addition, fine particles of alumina and the like can also be used. Further, it is preferred that the fine inorganic particles 10a have an average particle size of 5 to 50 nm. As described above and also shown in FIG. 3, such fine particles associate by van der Waals forces or electrostatic forces to form ring-shaped or helical secondary particles 10. The inside diameter of the ring (R) is preferably 0.1 µm (100 nm) or less. The mean free path of air acting as a heat transfer medium is about 100 nm at ordinary temperature, and hence when the inside diameter of the ring (R) is 0.1 µm (100 nm) or less, heat transfer through the secondary particles 10 can be almost prevented. As described later, the secondary particles 10 are overlaid in a deformed state to form the porous body. Thereby, the inside diameter of the ring (R) is also decreased to a size not larger than the mean free path. The fine inorganic particles 10a having an average particle size of 5 to 50 nm easily form the secondary particles 10 of such an inside diameter of the ring (R). These fine inorganic particles 10a may be used as a combination of two or more thereof. Further, they may be mixed with other inorganic particles as needed.

As the inorganic fiber 1F, there can be used a ceramic fiber such as alumina fiber, silica alumina fiber, silica fiber or mullite fiber, glass fiber or rock wool. Among them, a low thermal conductive inorganic fiber having a thermal conductivity at ordinary temperature (25° C.) of 0.1 W/(m·K) or less, preferably 0.04 W/(m·K) or less is preferred, and a silica-based fiber such as silica-alumina fiber or silica fiber can be suitably used. Further, it is preferred that the inorganic fiber 1F has an average fiber diameter of 15 μm or less. When the average fiber diameter exceeds 15 μm, a coating operation with the secondary particles 10 described later takes long because of an increase in the surface area of the fiber, resulting in production unfavorability. Furthermore, it is preferred that the inorganic fiber 1F has an average fiber length of 50 μm or more. When the average fiber length is less than 50 μm, the porous body-coated fiber 100F is poorly orientated to bring about insufficient mechanical strength. These inorganic fibers 1F may be used as a combination of two or more thereof.

Referring to the compounding ratio of the inorganic fiber 1F to the fine inorganic particles 10a, it is preferred that the inorganic fiber 1F accounts for 5 to 50% by weight and the fine inorganic particles 10a accounts for 50 to 95% by weight. When the compounding proportion of the fine inorganic particles 10a is less than 50% by weight, there is the possibility that the inorganic fiber 1F may be not sufficiently thickly coated with the secondary particles 10.

Figure 4:
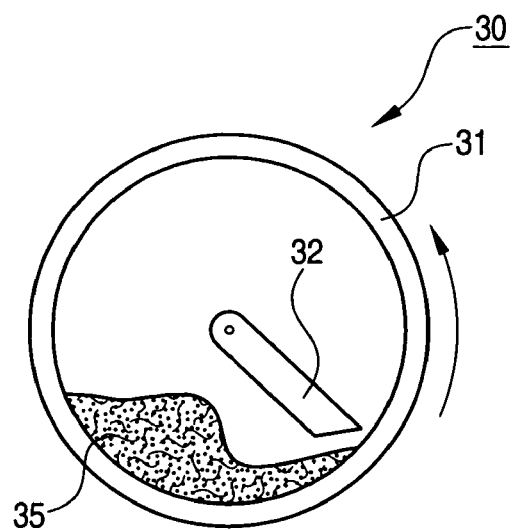
FIG. 4 is a schematic illustration showing a rotary mixer for producing the porous body-coated fiber and the porous body-coated particle of the invention.

The porous body-coated fiber 100F of the first invention can be obtained by allowing a mixture of the inorganic fiber 1F and the fine inorganic particles 10a mixed with each other at the above-mentioned compounding ratio to pass through little clearance repeatedly. Specifically, a rotary mixer 30 as shown in FIG. 4 is used. This rotary mixer 30 comprises a cylindrical chamber 31 and a pressing member 32 disposed therein. The chamber 31 rotates in the direction indicated by the arrow in the drawing, and the pressing member 32 is fixed so as to form specified little clearance between one end thereof and an inner wall of the chamber 31.

Then, the inorganic fiber 1F and the fine inorganic particles 10a are put in the rotary mixer 30 at the above-mentioned compounding ratio (indicated by the numerical reference 35 in the drawing), and the chamber 31 is driven for rotation. The inorganic fiber 1F is dispersed with this rotation, and at the same time, the secondary particles 10 comprising the fine inorganic particles 10a are fixed onto the individual inorganic fiber 1F. Other secondary particles 10 are sequentially overlaid thereon to form an overlaid product. By passing through the little clearance between the cylindrical chamber 31 and the pressing member 32, the secondary particles 10 come to be fixed onto the inorganic fiber 1F in the manner of being pushed into the surface thereof. Also, when the secondary particles 10 are overlaid, the secondary particles 10 are pushed against one another, so that the ring-shaped or helical secondary particles 10 are deformed, or dispersed to chain or individual fine inorganic particles 10a, resulting in mutual complicated entanglement thereof. It does not therefore happen that the fine inorganic particles 10a or the secondary particles 10 are eliminated from the inorganic fiber 1F. Further, a large number of fine voids are formed among the fine inorganic particles 10a, so that the resulting overlaid product becomes a porous body.

Figure 5:
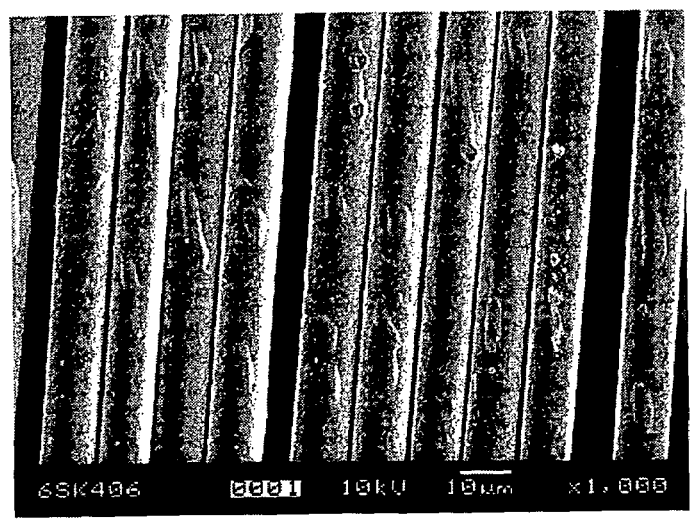
FIG. 5A is an electron photomicrograph image of an inorganic fiber.
FIG. 5B is an electron photomicrograph image of a cross section of a conventional heat insulating material.
FIG. 5C is an electron photomicrograph image of one example of the porous body-coated fiber according to the first invention.
Figure 5:
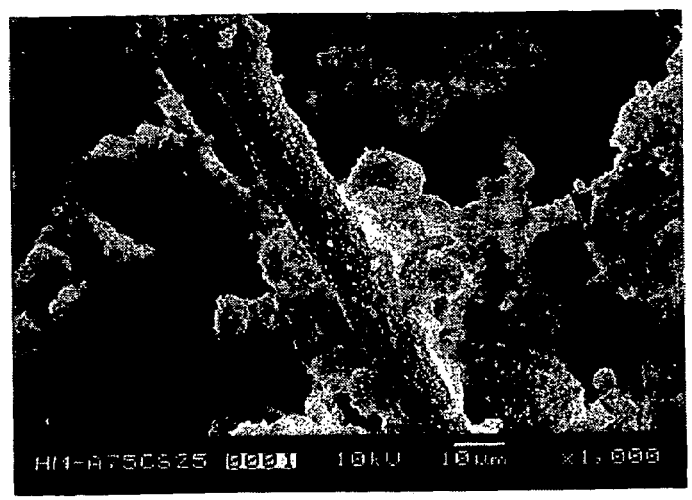
Figure 5:
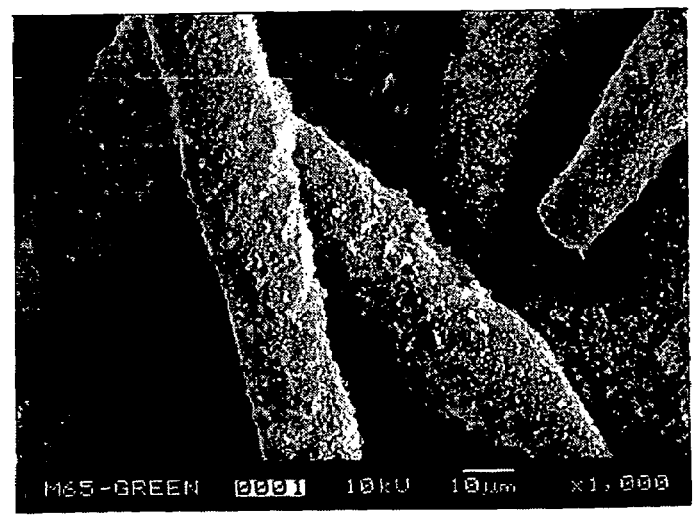

FIG. 5(B) is an electron photomicrograph of a cross section of a conventional heat insulating material comprising an inorganic fiber and fine inorganic particles. Secondary particles comprising the fine inorganic particles are dispersed among the fibers, and the surface of the inorganic fiber is exposed. In contrast, FIG. 50 is an electron photomicrograph of the porous body-coated fiber of the first invention, and the porous body comprising the secondary particles overlaid is formed on the surface of the inorganic fiber. This shows that the inorganic fiber is not exposed. FIG. 5A is an electron photomicrograph of an inorganic fiber alone.

The first invention also provides a formed article using the above-mentioned porous body-coated fiber. The formed article can be obtained, for example, by filling a predetermined mold with the porous body-coated fiber, and then conducting press-forming or the like. By adjusting the bulk density to a range of 200 to 600 kg/m$^3$, preferably 300 to 500 kg/M$^3$, a formed article excellent in heat insulating performance and mechanical strength can be obtained. Specifically, the formed article has a bending strength of 0.5 MPa, and is difficult to crack. It also has a thermal conductivity at ordinary temperature of 0.04 W/(m·k) or less, and exhibits excellent heat insulating performance. Further, when it is cut, no chipping of cut edges occurs. It is therefore also excellent in processability. Furthermore, the fine inorganic particles 10a are not eliminated, resulting in no contamination of the outside.

Next, the second invention will be described in detail below, with reference to the accompanying drawings.

Figure 2:
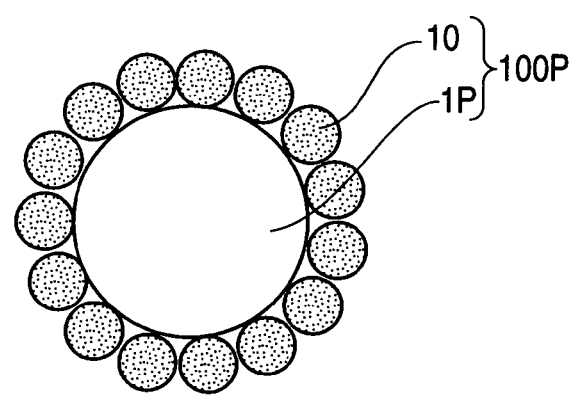
FIG. 2 is a schematic view showing one example of the porous body-coated particle according to the second invention.

FIG. 2 is a schematic view showing the porous body-coated particle of the second invention, and FIG. 3 is an enlarged schematic view showing the secondary particles of the fine particles comprising the inorganic compound (hereinafter referred to as "fine inorganic particles"). As shown in the drawings, secondary particles 10 formed by a plurality of fine inorganic particles 10a associated with one another in ring-shaped or helical manner are fixed onto a core particle 1P comprising an inorganic compound and further accumulate thereon, thus forming the porous body-coated particle 100P of the second invention. Accordingly, the porous body-coated particle 100P has a structure in which the core particle 1P is coated with a porous body comprising fine inorganic particles 10a.

As the core particle 1P, there can be used, for example, a particle comprising a radiation absorption scattering material such as silicon carbide, titanium oxide or zirconium oxide. Any radiation absorption scattering material can be used herein so long as it is an inorganic particle having an absolute refractive index of 1.5 or more, and should not be construed as being limited to the above-mentioned particle. In order to enhance the adhesion with respect to the fine inorganic particles 10a, this core particle 1P is preferably subjected to oxidation heat treatment. By the oxidation heat treatment, fine particles comprising an oxide are formed on the surface of the core particle 1 to form minute unevenness, thereby enhancing the adhesion with respect to the fine inorganic particles 10a. As for the treating conditions, the treatment can be made through heating in the air or in an atmosphere of oxygen at 800 to 1,200° C. for 3 to 12 hours. Further, considering the heat insulating performance and mechanical strength at the time when the core particle 1P is made into a formed article, it is preferred that the core particle 1P has an average particle size of 30 μm or less.

As the fine inorganic particles 10a, there can be used, for example, ultrafine granular anhydrous silica or supercritical dry silica. As described above, these materials have a thermal conductivity at ordinary temperature (25° C.) of about 0.01 W/(m·k), and they are also preferred in the second invention. In addition, fine particles of alumina or the like can also be used. Further, it is preferred that the fine inorganic particles 10a have an average particle size of 5 to 50 nm. As described above and also shown in FIG. 3, such fine particles-associate by van der Waals forces or electrostatic forces to form ring-shaped or helical secondary particles 10. The inside diameter of the ring (R) is preferably 0.1

μm (100 nm) or less. The mean free path of air acting as a heat transfer medium is about 100 nm at ordinary temperature, and hence when the inside diameter of the ring (R) is 0.1 μm (100 nm) or less, heat transfer through the secondary particles 10 can be almost prevented. As described later, the secondary particles 10 are overlaid in a deformed state to form the porous body. Thereby, the inside diameter of the ring (R) is also decreased to a size not larger than the mean free path. The fine inorganic particles 10a having an average particle size of 5 to 50 nm easily form the secondary particles 10 of such an inside diameter of the ring (R). These fine inorganic particles 10a may be used as a combination of two or more thereof. Further, they may be mixed with other inorganic particles as needed.

Referring to the compounding ratio of the core particles 1P to the fine inorganic particles 10a, it is preferred that the core particles 1P accounts for 5 to 50% by weight and the fine inorganic particles 10a accounts for 50 to 95% by weight. When the compounding proportion of the fine inorganic particles 10a is less than 50% by weight, there is the possibility that the core particles 1P may be not sufficiently thickly coated with the secondary particles 10.

The porous body-coated particle 100P of the second invention can be obtained by allowing a mixture obtained by dry mixing the core particles 1P with the fine inorganic particles 10a at the above-mentioned compounding ratio to pass through little clearance repeatedly. Specifically, a rotary mixer 30 as shown in FIG. 4 is used. This rotary mixer 30 comprises a cylindrical chamber 31 and a pressing member 32 disposed therein. The chamber 31 rotates in the direction indicated by the arrow in the drawing, and the pressing member 32 is fixed so as to form specified little clearance between one end thereof and an inner wall of the chamber 31.

Then, the core particles 1P and the fine inorganic particles 10a are put in the rotary mixer 30 at the above-mentioned compounding ratio (indicated by the numerical reference 35 in the drawing), and the chamber 31 is driven for rotation. The secondary particles 10 comprising the fine inorganic particles 10a are fixed onto the surfaces of the core particles 1P with this rotation, and other secondary particles 10 are sequentially overlaid thereon to form an overlaid product. By passing through the little clearance between the cylindrical chamber 31 and the pressing member 32, the secondary particles 10 come to be fixed onto the core particles 1P in the manner of being pushed into the surfaces thereof. Also, when the secondary particles 10 are overlaid, the secondary particles 10 are pushed against one another, so that the ring-shaped or helical secondary particles 10 are deformed, or dispersed to chain or individual fine inorganic particles 10a, resulting in mutual complicated entanglement thereof. It does not therefore happen that the fine inorganic particles 10a or the secondary particles 10 are eliminated from the core particles 1P. Further, a large number of fine voids are formed among the fine inorganic particles 10a, so that the resulting overlaid product becomes a porous body.

Figure 6:
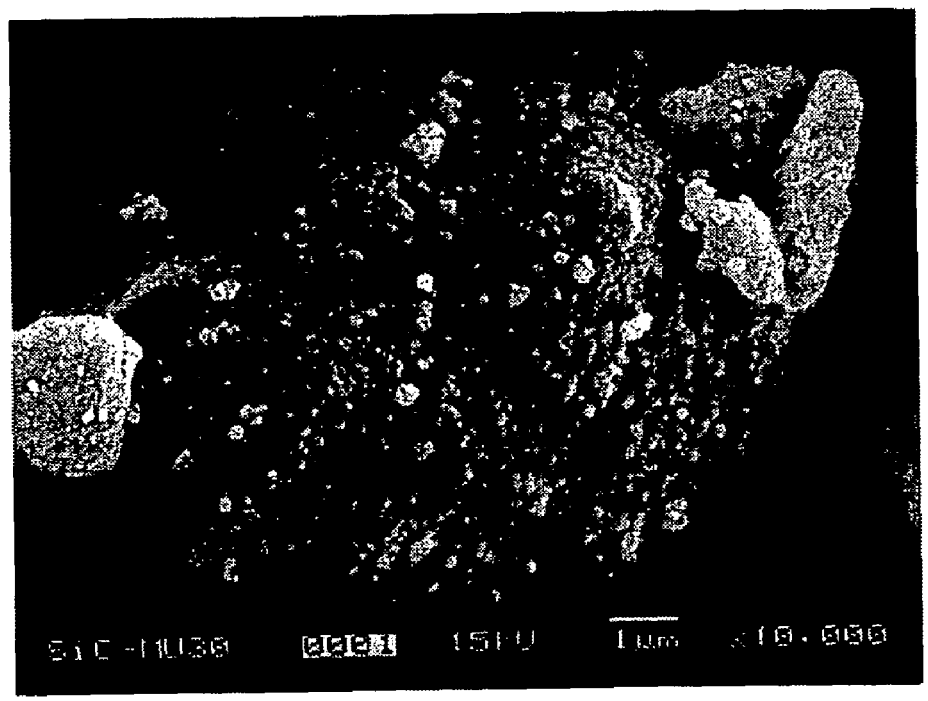
FIG. 6 is an electron photomicrograph image of one example of the porous body-coated particle according to the second invention.

FIG. 6 is an electron photomicrograph of the porous body-coated particle 100P prepared using silicon nitride having subjected to the oxidation heat treatment as the core particle 1P, and using ultrafine granular anhydrous silica as the fine inorganic particles 10a. This shows that a porous body in which the secondary particles comprising ultrafine granular anhydrous silica are overlaid is formed on the surface of the core particle, and that silicon nitride is not exposed.

The second invention also provides a formed article containing the above-mentioned porous body-coated particle 100P. However, it is difficult to form only the porous body-coated particle 100P, and the resulting formed article has poor shape retaining properties and low mechanical strength. Although it is conceivable to use a binder, it deteriorates the heat insulating performance. Accordingly, a fiber material is added to mix with the porous body-coated particle 100P in preparing the formed article in the second invention.

As the fiber material, there can be used an inorganic fiber itself or an inorganic fiber coated with a porous body comprising the secondary particles 10 of the fine inorganic particles 10a as described above. The use of the inorganic fibers coated with the porous body prevents inorganic fibers from directly contacting with one another in the formed article to cause no occurrence of solid conduction, resulting in excellent heat insulating performance.

As the inorganic fiber, there can be used a ceramic fiber such as alumina fiber, silica·alumina fiber, silica fiber or mullite fiber, glass fiber or rock wool. Among them, a low thermal conductive inorganic fiber having a thermal conductivity at ordinary temperature (25° C.) of 0.1 W/(m·K) or less, preferably 0.04 W/(m·K) or less is preferred, and a silica-based fiber such as silica·alumina fiber or silica fiber can be suitably used. Further, it is preferred that the inorganic fiber has an average fiber diameter of 15 μm or less. When the average fiber diameter exceeds 15 μm, a coating operation with the secondary particles 10 described later takes long because of an increase in the surface area of the fiber, resulting in production unfavorability. Furthermore, it is preferred that the inorganic fiber has an average fiber length of 50 μm or more. When the average fiber length is less than 50 μm, the porous body-coated fiber 100F is poorly orientated to bring about insufficient mechanical strength. These inorganic fibers may be used as a combination of two or more thereof.

Further, the inorganic fiber can be coated with the porous body comprising the secondary particles 10 of the fine inorganic particles 10a by mixing the inorganic fiber and the fine inorganic particles 10a by rotation using the rotary mixer.

Figure 7:
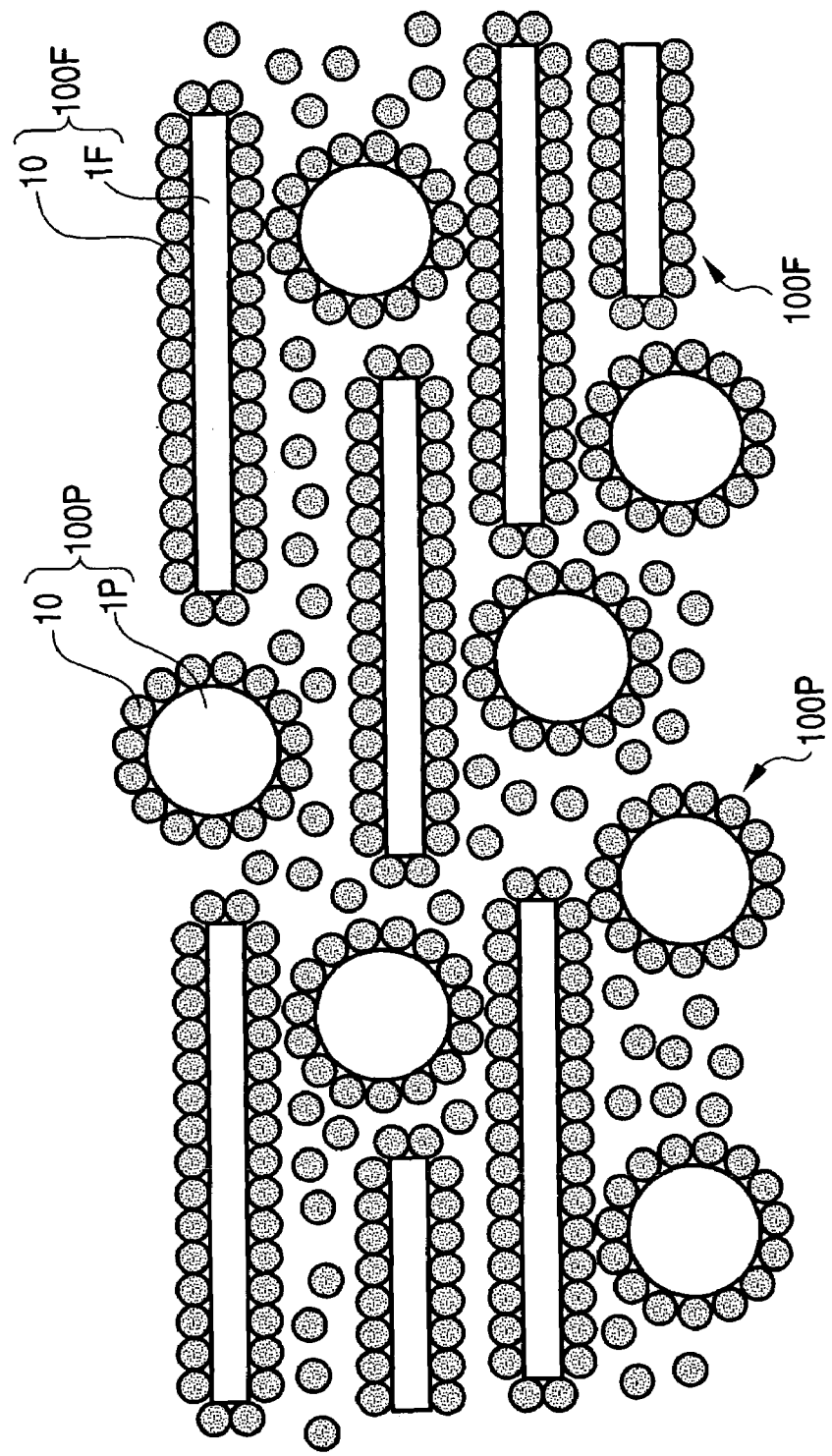
FIG. 7 is a schematic view showing one example of the formed article containing the porous body-coated particles according to the second invention.
Figure 8:
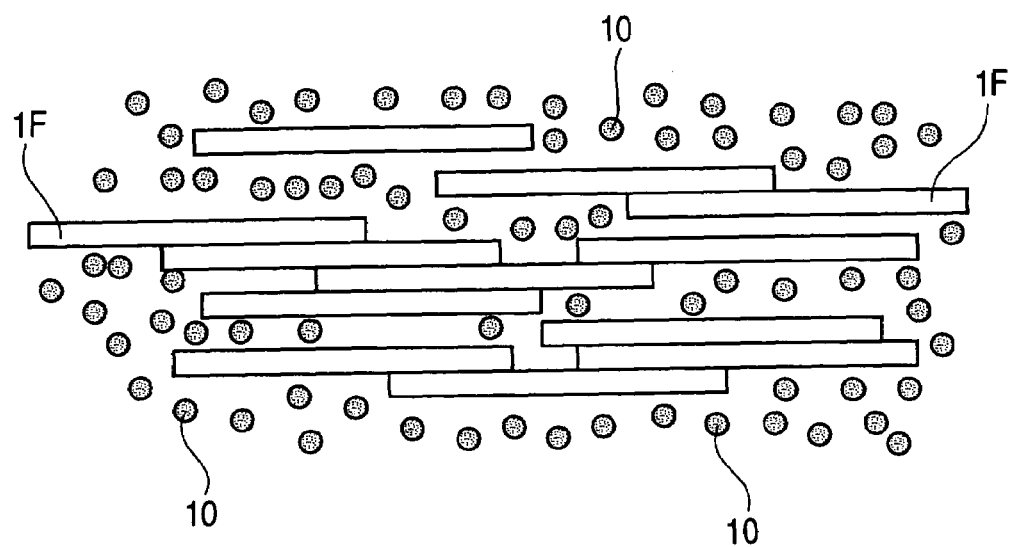
FIGS. 8(A) and 8(B) are schematic views showing conventional heat insulating materials.
Figure 8:
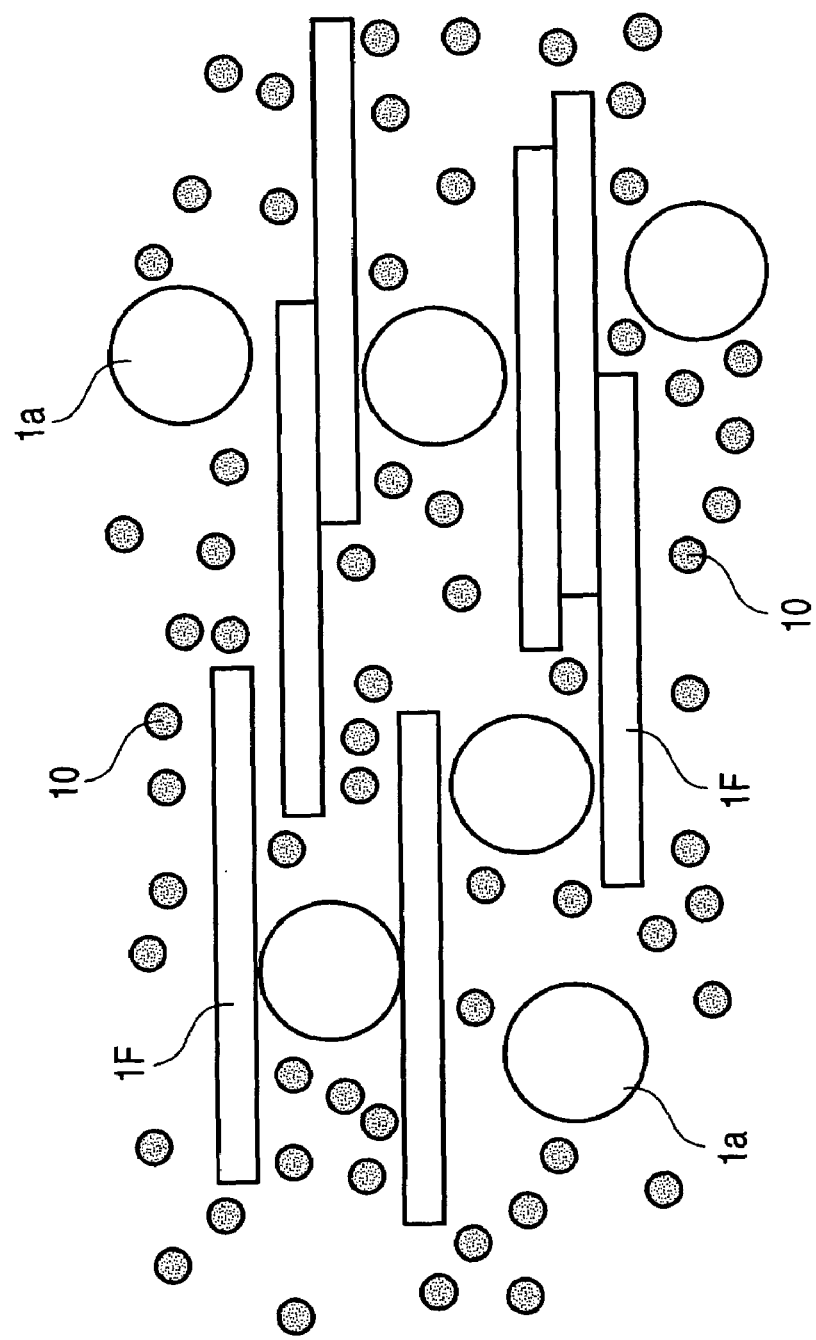

The formed article can be obtained by mixing the fiber materials and the above-mentioned porous body-coated particles 100P to prepare a formed article precursor, and filling a predetermined mold with the precursor, followed by press-forming. The formed article of the second invention is schematically shown in FIG. 7. The porous body-coated particles 100 are dispersed among the fiber materials (here, porous body-coated fiber comprising inorganic fibers 1F coated with the porous body comprising the secondary particles 10 of the fine inorganic particles 10a). The porous body-coated particles 100 are coated with the porous body comprising the secondary particles 10 of the fine inorganic particles 10a, so that solid conduction does not occur among the core particles, resulting in excellent heat insulating performance. Further, when the porous body-coated fiber 100F comprising the inorganic fibers 1F coated with the porous body comprising the secondary particles 10 of the fine inorganic particles 10a is used as the fiber material, solid conduction among the fiber materials disappears to give further enhanced heat insulating performance.

As for the compounding ratio of the porous body-coated particle 100P to the fiber material, the porous body-coated particle 100P is incorporated preferably in an amount of 55 to 95% by weight based on the total, and the fiber material is preferably in an amount of 5 to 45% by weight, considering the heat insulating performance and mechanical characteristics of the resulting formed article.

Further, by adjusting the bulk density to a range of 200 to 600 kg/M$^3$, preferably 300 to 500 kg/M$^3$, a formed article excellent in heat insulating performance and mechanical strength can be obtained. Specifically, the formed article has a bending strength of 0.5 MPa, and is difficult to crack. It also has a thermal conductivity at 1,000° C. of 0.04 W/(m·k) or less, and exhibits excellent heat insulating performance. Further, when it is cut, no chipping of cut edges occurs. It is therefore also excellent in processability. Moreover, the fine inorganic particles 10a are not eliminated, resulting in no contamination of the outside.

EXAMPLES

The present invention will be illustrated in greater detail with reference to the following Examples and Comparative Examples, but the invention should not be construed as being limited thereto.

Example 1A

Three percents by weight of a silica-based ceramic fiber having an average fiber diameter of 10 μm and an average fiber length of 5,000 μm and 97% by weight of fine silica particles having an average particle size of 7 nm and a thermal conductivity (25° C.) of 0.01 W/(m·k) were put in the rotary mixer 30 shown in FIG. 4, and the chamber 31 was continuously rotated at a rotational speed of 1,000 rpm for 30 minutes, setting the little clearance between the chamber 31 and the pressing member 32 to 2,000 μm. Then, the contents were taken out, and observed under an electron microscope. As a result, the surface of the ceramic fiber was completely covered with a porous body comprising the fine silica particles, as shown in FIG. 5(C). Further, the contents were dry pressed at 6 MPa to obtain a formed article having a size of 150 mm on a side and a thickness of 10 mm and a bulk density of 376 kg/m$^3$. The bending strength and thermal conductivity (25° C.) of this formed article are shown in Table 1A.

Example 2A

A formed article was obtained in the same manner as with Example 1A with the exception that 5% by weight of the silica-based ceramic fiber and 95% by weight of the fine silica particles were used. The bulk density, bending strength and thermal conductivity of this formed article are shown in Table 1A. Further, prior to the forming, the contents were observed under an electron microscope. As a result, the surface of the ceramic fiber was completely covered with a porous body comprising the fine silica particles.

Example 3A

A formed article was obtained in the same manner as with Example 1A with the exception that 10% by weight of the silica-based ceramic fiber and 90% by weight of the fine silica particles were used. The bulk density, bending strength and thermal conductivity of this formed article are shown in Table 1A. Further, prior to the forming, the contents were observed under an electron microscope. As a result, the surface of the ceramic fiber was completely covered with a porous body comprising the fine silica particles.

Example 4A

A formed article was obtained in the same manner as with Example 1A with the exception that 25% by weight of the silica-based ceramic fiber and 75% by weight of the fine silica particles were used. The bulk density, bending strength and thermal conductivity of this formed article are shown in Table 1A. Further, prior to the forming, the contents were observed under an electron microscope. As a result, the surface of the ceramic fiber was completely covered with a porous body comprising the fine silica particles.

Example 5A

A formed article was obtained in the same manner as with Example 1A with the exception that 50% by weight of the silica-based ceramic fiber and 50% by weight of the fine silica particles were used. The bulk density, bending strength and thermal conductivity of this formed article are shown in Table 1A. Further, prior to the forming, the contents were observed under an electron microscope. As a result, the surface of the ceramic fiber was completely covered with a porous body comprising the fine silica particles.

Example 6A

A formed article was obtained in the same manner as with Example 1A with the exception that 75% by weight of the silica-based ceramic fiber and 25% by weight of the fine silica particles were used. The bulk density, bending strength and thermal conductivity of this formed article are shown in Table 1A. Further, prior to the forming, the contents were observed under an electron microscope. As a result, the surface of the ceramic fiber was completely covered with a porous body comprising the fine silica particles.

Example 7A

A formed article was obtained in the same manner as with Example 1A with the exception that 25% by weight of the silica-based ceramic fiber and a mixture of 65% by weight of the fine silica particles and 10% by weight of titania particles having an average refractive index of 2.72 or more and an average particle size of 1 μm as the fine inorganic particles were used. The bulk density, bending strength and thermal conductivity of this formed article are shown in Table 1A. Further, prior to the forming, the contents were observed under an electron microscope. As a result, the surface of the ceramic fiber was completely covered with a porous body comprising the fine silica particles and the titania particles.

Comparative Example 1A

Twenty-five percents by weight of the silica-based ceramic fiber and 75% by weight of the fine silica particles were mixed and stirred with a mixer, and the resulting mixture was dry pressed at 6 MPa to obtain a formed article. The bulk density, bending strength and thermal conductivity of this formed article are shown in Table 1A. Further, prior to the forming, the contents were observed under an electron microscope. As a result, the surface of the silica-based ceramic fiber was exposed, and large particles formed by aggregation of the fine silica particles were dispersed among the fibers, as shown in FIG. 5(B).

Comparative Example 2A

Ninety-five percents by weight of the silica-based ceramic fiber and 5% by weight of the fine silica particles were mixed and stirred with a mixer to obtain a mixture. Then, it was attempted to form the mixture by dry pressing. However, no formed article was obtained. Further, prior to the forming, the contents were observed under an electron microscope. As a result, the surface of the silica-based ceramic fiber was exposed, and large particles formed by aggregation of the fine silica particles were dispersed among the fibers, similarly to Comparative Example 1A.

TABLE 1

|  | Ex. 1A | Ex. 2A | Ex. 3A | Ex. 4A | Ex. 5A | Ex. 6A | Ex. 7A | Comp. Ex. 1A | Comp. Ex. 2A |
|---|---|---|---|---|---|---|---|---|---|
| Silica-Based Ceramic Fiber | 3 | 5 | 10 | 25 | 50 | 75 | 25 | 25 | 95 |
| Fine Silica Particles | 97 | 95 | 90 | 75 | 50 | 25 | 65 | 775 | 5 |
| Titania Particles | — | — | — | — | — | — | 10 | — | — |
| Bulk Density (kg/m$^3$) | 351 | 376 | 396 | 434 | 495 | 812 | 420 | 1024 | Unmoldable |
| Bending Strength (MPa) | 0.20 | 0.50 | 0.71 | 0.56 | 0.51 | 0.13 | 0.13 | 1.83 |  |
| Thermal Conductivity (W/(m · K), 25° C.) | 0.037 | 0.035 | 0.030 | 0.026 | 0.024 | 0.045 | 0.032 | 0.084 |  |

Note)
Amounts added are indicated in terms of % by weight.

Table 1A shows that in each Example according to the first invention, the inorganic fiber completely coated with the porous body comprising the fine inorganic particles is obtained, and that the formed article also has low thermal conductivity and excellent heat insulating performance according thereto. In particular, all the formed articles of Examples 2A to 5A in which 5 to 50% by weight of the inorganic fiber and 95 to 50% by weight of the fine inorganic particles are incorporated have a bending strength as high as 0.5 MPa or more and also have high mechanical strength.

In contrast, in Comparative Examples 1A and 2A, the fine inorganic particles are dispersed among the inorganic fibers to cause poor heat insulating performance. Further, in Comparative Example 2A, the mixture has no shape retaining properties, and is also poor in moldability.

Example 1B

Silicon carbide having an average particle size of 3 μm was subjected to oxidation heat treatment in the air at 1,000° C. for 8 hours to prepare core particles. Twenty-five percents by weight of the core particles and 75% by weight of fine silica particles having an average particle size of 7 nm and a thermal conductivity (25° C.) of 0.01 W/(m·k) were put in the rotary mixer 30 shown in FIG. 4, and the chamber 31 was continuously rotated at a rotational speed of 1,000 rpm for 30 minutes, setting the little clearance between the chamber 31 and the pressing member 32 to 2,000 μm. Then, the contents were taken out, and observed under an electron microscope. As a result, the surface of the core particle was completely covered with a porous body comprising the fine silica particles, as shown in FIG. 7.

Eighty percents by weight of the porous body-coated particles thus prepared and 20% by weight of a silica-based ceramic fiber having an average fiber diameter of 10 μm and an average fiber length of 5,000 μm were dry mixed to prepare a precursor for a formed article. This precursor was then subjected to press-forming to obtain a formed article having a size of having a size of 150 mm on a side and a thickness of 10 mm. The press pressure was 6 MPa. The bulk density, bending strength and thermal conductivity of the resulting formed article are shown in Table 1B.

Example 2B

Three percents by weight of the silica-based ceramic fiber used in Example 1B and 97% by weight of the fine silica particles were put in the rotary mixer 30 shown in FIG. 4, and the chamber 31 was continuously rotated at a rotational speed of 1,000 rpm for 30 minutes, setting the little clearance between the chamber 31 and the pressing member 32 to 2,000 μm, thereby preparing a silica-based ceramic fiber coated with the fine silica particles.

Twenty percents by weight of the silica-based ceramic fiber coated with the fine silica particles thus prepared and 80% by weight of the porous body-coated particles used in Example 1B were dry mixed to prepare a precursor for a formed article. This precursor was subjected to press-forming to obtain a formed article having a size of 150 mm on a side and a thickness of 10 mm. The press pressure was 6 MPa. The bulk density, bending strength and thermal conductivity of the resulting formed article are shown in Table 1B.

Comparative Example 1B

Eighty percents by weight of silicon carbide having an average particle size of 3 μm and 20% by weight of a silica-based ceramic fiber having an average fiber diameter of 10 μm and an average fiber length of 5,000 μm were dry mixed to prepare a precursor for a formed article. This precursor was subjected to press-forming to obtain a formed article having a size of 150 mm on a side and a thickness of 10 mm. The press pressure was 6 MPa. The bulk density, bending strength and thermal conductivity of the resulting formed article are shown in Table 1B.

Comparative Example 2B

Eighty percents by weight of silicon carbide having an average particle size of 3 μm and 20% by weight of the silica-based ceramic fiber coated with the fine silica particles prepared in Example 2B were dry mixed to prepare a precursor for a formed article. This precursor was subjected to press-forming to obtain a formed article having a size of 150 mm on a side and a thickness of 10 mm. The press pressure was 6 MPa. The bulk density, bending strength and thermal conductivity of the resulting formed article are shown in Table 1B.

TABLE 1B

| | Presence or Absence of Coating with Porous Body | | | | Thermal Conductivity (W/(m·k)) | | | |
|---|---|---|---|---|---|---|---|---|
| | Fiber Material | Radiation Absorption Scattering Material | Density (kg/m³) | Bending Strength (MPa) | 100° C. | 400° C. | 600° C. | 1000° C. |
| Example 1B | Not coated | Coated | 405 | 0.30 | 0.025 | 0.027 | 0.031 | 0.035 |
| Example 2B | Coated | Coated | 393 | 0.48 | 0.024 | 0.026 | 0.031 | 0.033 |
| Comparative Example 1B | Not coated | Not coated | 346 | 0.16 | 0.030 | 0.036 | 0.048 | 0.080 |
| Comparative Example 1B | Coated | Not coated | 391 | 0.20 | 0.029 | 0.028 | 0.042 | 0.054 |

Table 1B shows that the formed articles of Examples 1B and 2B according to the second invention have high mechanical strength and low thermal conductivity to bring about excellent heat insulating performance. Further, a comparison between Examples 1B and 2B reveals that the use of the fiber material coated with the fine inorganic particles further enhances mechanical strength and heat insulating performance.

In contrast, the formed article of Comparative Example 1B in which both the core particles and the inorganic fiber are not coated with the fine inorganic particles is low in mechanical strength and also greatly inferior in heat insulating performance. The formed article of Comparative Example 2B in which the fiber material coated with the fine inorganic particles is used is inferior to the formed articles of Examples, although it is observed that both mechanical characteristics and heat insulating performance are improved.

While the present invention has been described in detail and with reference to specific embodiments thereof, it will be apparent to one skilled in the art that various changes and modifications can be made therein without departing from the spirit and scope thereof.

For example, although the formed articles of the present invention has been illustrated above mainly with reference to the application as heat insulating materials, the porous body-coated fiber and the porous body-coated particle of the present invention can be applied to other users and hence the formed articles of the present invention encompass various articles such as electromagnetic wave absorbing body and damping plate.

The present application is based on Japanese patent application Nos. 2003-152877 (filed May 29, 2003) and 2003-316772 (filed Sep. 9, 2003), the contents thereof being herein incorporated by reference.

What is claimed is:

1. A formed article obtained by pressure-forming a porous body-coated fiber, the porous body-coated fiber comprising:
   an inorganic fiber; and
   a porous body comprising fine inorganic particles associated with one another in ring-shaped or helical manner to form secondary particles,
   wherein said inorganic fiber is coated with said porous body, and
   wherein said formed article has a bulk density of 200 to 600 kg/m³ and a bending strength of 0.5 MPa or more.

2. The formed article according to claim 1, wherein said inorganic fiber has an average fiber diameter of 15 μm or less, and an average fiber length of 50 μm or more.

3. The formed article according to claim 1, wherein said fine inorganic particles have an average primary particle size of 5 to 50 nm.

4. The formed article according to claim 1, wherein said secondary particles have an inside diameter of the ring of 0.1 μm or less.

5. The formed article according to claim 1, comprising 5 to 50% by weight of said inorganic fiber and 50 to 95% by weight of said fine inorganic particles.

6. A formed article obtained by pressure-forming a porous body-coated fiber, the porous body-coated fiber comprising:
   an inorganic fiber; and
   a porous body comprising fine inorganic particles associated with one another in ring-shaped or helical manner to form secondary particles,
   wherein said inorganic fiber is coated with said porous body, and
   wherein said formed article has a thermal conductivity at ordinary temperature (25°) of 0.04 W/(m·k) or less.

7. The formed article according to claim 6, wherein said inorganic fiber has an average fiber diameter of 15 μm or less, and an average fiber length of 50 μm or more.

8. The formed article according to claim 6, wherein said fine inorganic particles have an average primary particle size of 5 to 50 nm.

9. The formed article according to claim 6, wherein said secondary particles have an inside diameter of the ring of 0.1 μm or less.

10. The formed article according to claim 6, comprising 5 to 50% by weight of said inorganic fiber and 50 to 95% by weight of said fine inorganic particles.

11. A formed article obtained by pressure-forming a formed article precursor.
   wherein the formed article precursor comprises:
   (a) at least one fiber material selected from the group consisting of:
      (a1) an inorganic fiber and
      (a2) a porous body-coated fiber comprising an inorganic fiber and a porous body which comprises fine inorganic particles associated with one another in a ring-shaped or helical manner to form secondary particles, said inorganic fiber being coated with said porous body; and
   (b) a porous body-coated particle comprising
      (b1) core particle comprising a second inorganic compound; and (b2) a porous body comprising fine particles of a first inorganic compound associated with one another in a ring-shaped or helical manner to form secondary particles, wherein said core particle is coated with said porous body; and wherein the formed article has a bulk density of 200 to 600 kg/m$^3$ and a bending strength of 0.3 MPa or more.

12. The formed article according to claim 11, having a thermal conductivity at 1,000° C. of 0.04 WI(m·k) or less.

13. The formed article according to claim 11, wherein said core particle has an average particle size of 30 μm or less.

14. The formed article according to claim 11, wherein said fine particles of a first inorganic compound have an average primary particle size of 5 to 50 nm.

15. The formed article according to claim 11, wherein said secondary particles have an inside diameter of the ring of 0.1 μm or less.

16. The formed article according to claim 11, wherein the porous body-coated particle comprises 5 to 50% by weight of said core particle and 50 to 95% by weight of said fine particles.

17. The formed article according to claim 11, wherein the formed article precursor comprises 55 to 95% by weight of said porous body-coated particle and 5 to 45% by weight of said fiber material.

\* \* \* \* \*